United States Patent [19]

Solhjell

[11] Patent Number: 4,639,796

[45] Date of Patent: Jan. 27, 1987

[54] ARRANGEMENT FOR POSITIONING A TRANSDUCER TO AT LEAST ONE TRACK OF A TAPE-SHAPED RECORDING MEDIUM

[75] Inventor: Erik Solhjell, Oslo, Norway

[73] Assignee: Tandberg Data A/S, Oslo, Norway

[21] Appl. No.: 687,527

[22] Filed: Dec. 28, 1984

[30] Foreign Application Priority Data

Dec. 30, 1983 [DE] Fed. Rep. of Germany ....... 3347632

[51] Int. Cl.$^4$ ........................... G11B 5/55; G11B 5/56
[52] U.S. Cl. ......................................... 360/77; 360/78
[58] Field of Search ..................................... 360/77, 78

[56] References Cited

U.S. PATENT DOCUMENTS 4,176,381 11/1979 De Niet et al. ..................... 360/77

Primary Examiner—George G. Stellar
Attorney, Agent, or Firm—Hill, Van Santen, Steadman & Simpson

[57] ABSTRACT

For accurate positioning of a transducer to a track of a tape-recording medium, for example a magnetic head to a magnetic tape, a sensing device is utilized which is partially covered by the edge of the recording medium and comprises a light barrier structure. In the first embodiment, the light barrier structure is fixed at a control signal generated by way of a converter is supplied to a positioning device for the transducer. Dependent on the control signal, the transducer is positioned such that the write and read elements thereof respectively have a prescribed distance from the edge of the recording medium. In a second embodiment, at least one part of the light barrier is disposed at the transducer 4 and extends in the region of the transducer 4 to a region which corresponds to the stroke of the positioning of the transducer when the same is positioned to different tracks.

9 Claims, 5 Drawing Figures

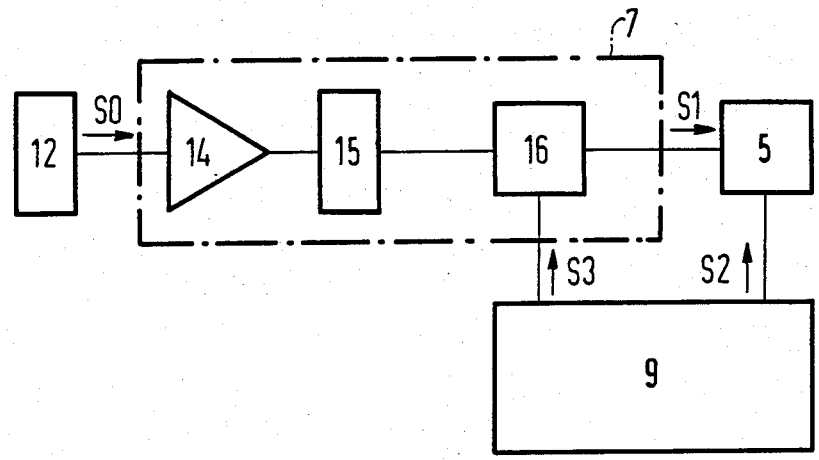
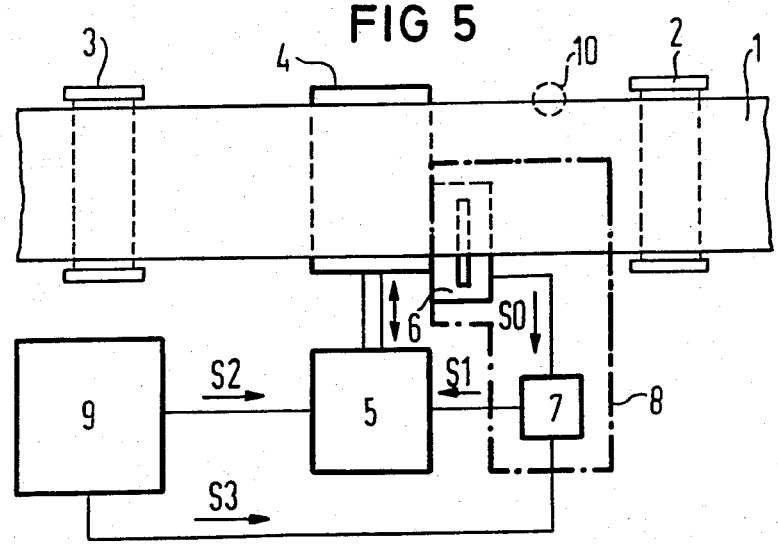

ARRANGEMENT FOR POSITIONING A TRANSDUCER TO AT LEAST ONE TRACK OF A TAPE-SHAPED RECORDING MEDIUM

BACKGROUND OF THE INVENTION

1. Field of the Invention

The present invention relates to an arrangement for positioning a transducer with respect to at least one track of a tape-shaped recording medium, whereby the transducer is displaceable perpendicular to the moving direction of the recording medium using a positioning device and an opto-electronic sensor comprises a light barrier device and a converter such that an active light beam of the light barrier is partially interrupted by an edge of the recording medium and the converter produces a control signal assigned to the interruption of the light beam to the positioning device.

2. Description of the Prior Art

Arrangements of the type generally set forth above are already known in the art. A magnetic head which contains one or more write and/or read heads is also provided as the transducer and a magnetic tape is generally provided as the tape-shaped recording medium. Such an arrangement, however, can also be employed in an optical memory in which data are recorded on a suitable, tape-shaped recording medium, for example, using a laser.

A tape-shaped recording medium, for example a magnetic tape, is usually guided between stationary guide rollers at both sides of the magnetic head in order to hold the magnetic tape in a stable position. A disruption or deviation of the magnetic tape relative to the magnetic head and perpendicular to the direction of movement of the tape often occurs as a consequence of tolerances in the manufacture of the guide rollers, as a consequence of play between the magnetic tape and the guide rollers, and as a consequence play in the seating of the guide rollers. Given high track density, i.e. given a large number of parallel tracks on the magnetic tape, this deviation of the magnetic tape can have a disruptive influence since, on the one hand, the individual write and read heads are no longer accurately positioned to the corresponding track and since, on the other hand, the number of parallel tracks and, therefore, the storage capacity of the magnetic tape becomes restrictive.

An arrangement in which a magnetic head is automatically positioned to the corresponding tracks of the magnetic tape is already known from the European published application No. 32 660. To this end, two further magnetic heads are provided, these being slightly inclined toward the magnetic tape and sensing the tracks in the proximity of the edges of the magnetic tape. The phase differences of the signals from the sensed tracks are employed to generate a signal which is supplied to a positioning device for the magnetic head and displaces the same perpendicular to the moving direction of the tape under given conditions in order to accurately position the magnetic head to the corresponding tracks. It is required, given this known arrangement, that signals are always recorded on the edge tracks. This known arrangement can no longer be employed for the positioning of a transducer in case the magnetic head comprises only a few write and read heads which can be positioned to the various tracks of the magnetic tape using the positioning device since the further magnetic heads can then no longer sense the edge tracks.

The Japanese Patent No. 55-13 25 22, fully incorporated herein by this reference, discloses an arrangement in which opto-electronic sensing arrangements, designed as light barriers, are provided in the proximity of the edges of the magnetic tape for the purpose of active positioning to the tracks of the magnetic tape. The light transmitted from a light transmitter to a light receiver is respectively partially interrupted by the magnetic tape. Dependent upon the magnitude of the interruption and, therefore, dependent upon the vertical motion of the magnetic tape, a device which varies the tension of the magnetic tape and thus compensates movements of the magnetic tape in the vertical direction is driven. This known arrangement is likewise not suitable when the magnetic head is designed so as to be displaceable to various tracks of the magnetic tape by the positioning device. Further, this known arrangement requires a relatively high expense since the apparatus for varying the pre-tension of the magnetic tape must be additionally provided.

A further arrangement for positioning a magnetic head to the tracks of the magnetic tape is known from the British published application No. 2,008,290, fully incorporated herein by this reference. This known arrangement likewise comprises two opto-electronic sensing devices disposed at the magnetic head which sense the edges of the magnetic tape. The signals output by the light receivers of the sensing arrangements are subtracted from one another and are supplied to a positioning device which respectively displaces the magnetic head in the vertical direction until the difference between the signals disappears. This known arrangement can likewise not be employed when the magnetic head is positionable to different tracks of the magnetic tape. In this case, the control signal is constant and can no longer be employed as a controlled variable for accurate positioning.

SUMMARY OF THE INVENTION

It is therefore the object of the invention to provide an arrangement which can also be employed when the transducer is designed so as to be positionable to different tracks of the tape-shaped recording medium.

Given an arrangement of the type initially set forth, the object is achieved, according to one embodiment of the present invention, by providing that the light barrier device is arranged fixed and the converter generates a control signal from the signal output by the light barrier and emits the control signal to the positioning device. The position of the transducer in the transverse direction of the recording medium is controlled with the positioning device such that the transducer follows the edges of the recording medium in terms of its position and transverse direction.

In another embodiment of the invention, the light transmitter and/or a light receiver of the light barrier is mechanically connected to a transducer which is positionable to various tracks of the recording medium using a positioning device. The active light beam of the light barrier has an expanse in the region of the edge of the recording medium which is at least equal to the maximum stroke of the transducer upon positioning to the various tracks. The converter generates control signals whose momentary value is assigned to the respective displacement of the transducer relative to the edge of the recording medium.

The arrangement of the invention has the advantage that it requires a particularly low expense, since a positioning device provided for positioning the transducer to various tracks of the recording medium is also employed for the accurate positioning of the transducer to a track. A particularly low expense is further achieved in that only a single sensing arrangement is required. Given the first embodiment set forth above, however, a further sensing arrangement can be provided at the other edge of the recording medium. In this case, the control signal can likewise be generated by way of subtraction of the signals output by the two sensing arrangements. Given the use of only a single sensing device, a further control signal is generated by subtraction of a constant value from the control signal and this further control signal is supplied to the positioning device.

The generation of the control signals can occur using analog or digital circuits. Given the generation thereof in analog fashion, the corresponding converter contains only an amplifier which can be designed as a summing amplifier or a differential amplifier, depending upon whether one or two sensing elements are provided, or whether a respective constant value is subtracted from the original control signal in order to generate the further control signal. Given the digital construction, the amplifier is followed by an analog/digital converter which, in turn, is followed by a digital control unit, for example a microcomputer, which respectively outputs a numerical value to the positioning device in order to accurately position the magnetic head. A constant numerical value or a numerical value dependent upon the track to which the transducer is being positioned can also be subtracted from this value.

A magnetic head comprising one or more write and-/or read heads is advantageously provided as the transducer.

Given the embodiment in which the sensing arrangement is at least partially connected to the transducer, the sensing arrangement can also be employed for recognizing the edge of the recording medium. This, for example, is possible when the sensing device, together with the transducer, can be displaced to such a degree that the light beam between the light transmitter and the light receiver of the sensing arrangement is no longer interrupted by the recording medium.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 4 is a block diagram of a portion of the sensing arrangement; and

FIG. 5 is a block diagram of a second embodiment of the invention.

DESCRIPTION OF THE PREFERRED EMBODIMENTS

Figure 1:
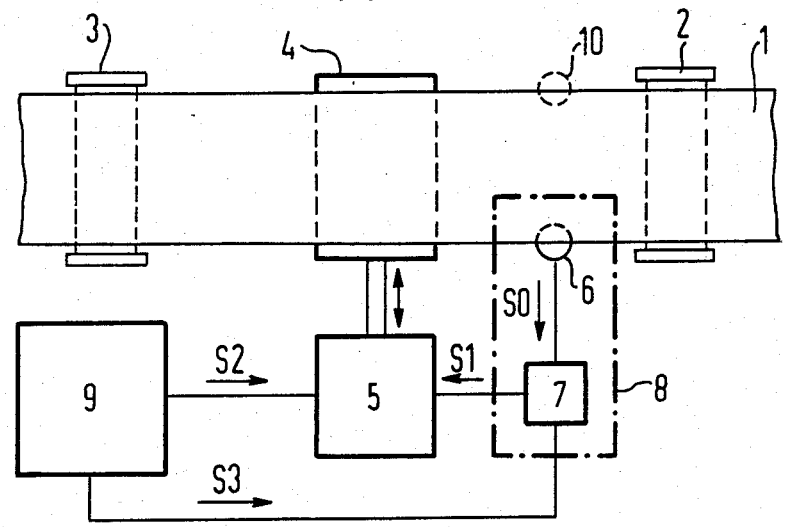
FIG. 1 is a block diagram of a first exemplary embodiment of the invention.

Referring to FIG. 1, a tape-shaped recording medium 1, for example a magnetic tape, is moved over a pair of guide rollers 2 and 3 in the longitudinal direction. A transducer 4, for example a magnetic head, is disposed between guide rollers 2 and 3, being disposed so as to be displaceable perpendicular to the direction of movement of the recording medium by a positioning device 5. The transducer 4 can contain one or more write and-/or read heads. The positioning device 5 can be designed so that it can position the write and/or read heads of the transducer 4 to those tracks of the recording medium 1 and/or such that it can execute a fine positioning to at least one track. Such positioning devices are generally known in the art and are disclosed, for example, in the European published application No. 32 660, in the British published application No. 2,008,290, in U.S. Pat. No. 3,524,196 and in the German published application No. 31 12 886, all of which are fully incorporated herein by this reference.

When recording data on the recording medium 1, it is desirable to accommodate the largest possible number of tracks on the recording medium 1 in order to increase the recording density. A natural limit, however, is given by the fact that the recording medium can also exhibit movement in the transverse direction or a tape skew as a result, of tolerances in the guide rollers 2 and 3. In order to compensate the effects of this transverse movement, the arrangement contains a sensing device 8 formed of a light barrier 6 and a converter 7, the sensing device 8 emitting a control signal S1 to the positioning device 5 whose momentary value is assigned to the transverse movement of the recording medium 1 and which effects a corresponding displacement of the transducer 4 by the positioning device 5. The position of the transducer 4 relative to the recording medium 1 is controlled by the control signal S1 such that the position of the transducer 4 in the transverse direction of the recording medium respectively follows the edge thereof. It therefore becomes possible to increase the number of tracks on the recording medium 1. In case the transducer 4 is positionable to different tracks of the recording medium 1, a control unit 9 supplies the positioning device 5 with a positioning signal S2 which effects the setting to the respective track by the positioning device 5. A fine positioning of the transducer 4 to the corresponding track or, respectively, tracks also occurs in this case using the control signal S1.

The light barrier 6 can be designed as a hole light barrier or as a reflective light barrier. It can be operated upon the use of visible or invisible light. Further, a further light barrier 10 can be provided at the other edge of the recording medium 1, this further light barrier 10 being likewise connected to the converter 7 and the control signal S1 being generated from the difference of the respective coverage by the recording medium 1.

Figure 2:
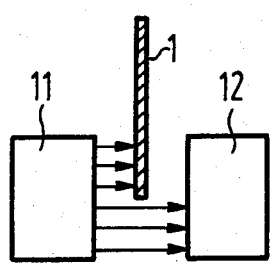
FIG. 2 is a block diagram of a first embodiment of a sensing arrangement.

The embodiment of a light barrier 6 illustrated in FIG. 2 is designed as a hole light barrier. The light transmitter, which is designed, for example, as a light-emitting diode, transmits modulated or unmodulated light to a light receiver 12. The light beam is partially masked by the recording medium 1. For example, the light transmitter 11 and the light receiver 12 are arranged such that the recording medium 1 masks half the light beam in the normal case. Given a transverse movement of the recording medium 1, the light beam is correspondingly masked more or less, so that the corresponding control signal S1 can be generated.

Figure 3:
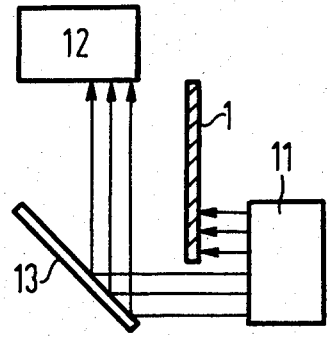
FIG. 3 is a block diagram of a second embodiment of the sensing arrangement.

A further illustrative embodiment of the light barrier 6 is illustrated in FIG. 3 and is likewise designed as a hole light barrier, whereby a mirror 13 is disposed between the light transmitter 11 and the light receiver 12.

Further possibilities for the design of the light barrier 6 are also conceivable, whereby, for example, the light transmitter 11 and the light receiver 12 in accordance with FIG. 3 can be interchanged. Given design as a reflected light barrier, both the light transmitter and the light receiver are disposed at the side of the recording medium and a mirror is provided at the other side of the recording medium, in this case, for example, a mirror disposed parallel to the recording medium 1.

Given the embodiment illustrated in FIG. 1, the light barrier is fixed and the active diameter of the light beam is greater than the possible movement of the recording medium 1 in the transverse direction.

There are numerous possibilities for the design of the converter 7. In the most simple case, the converter 7 is designed as an amplifier which amplifies a signal S0 emitted by the light barrier 6 and assigned to the transverse movement of the recording medium and supplied the same to the positioning device 5 as a control signal S1. The amplifier can also be designed such that a respective constant value, assigned to the partial masking of the light beam in the normal case, is subtracted from the momentary value of the signal S0 or the signal S1.

A converter 7 shown in FIG. 4 operates in a digital manner. This converter 7 also contains an amplifier 14 to which the signal S0 is supplied from the light receiver 12 of the light barrier. The amplifier is followed by a analog-to-digital converter 15 which assigns a digital numerical value to the respective momentary value of the signal at the output of the amplifier 14 and supplies the numerical value to a digital circuit for the determination of a digital control signal S1. The digital circuit is advantageously designed as a microcomputer 16. The microcomputer is supplied with a constant value by way of a signal S3, the constant value being respectively subtracted from the value output by the analog-to-digital converter 15 in order to supply the positioning device 5 with a control signal S1 assigned to the deviation of the position of the recording medium 1 from its reference position in the transverse direction. The control signal S2 is additionally supplied to the positioning device 5 by the control unit 9.

Given the second embodiment of the arrangement illustrated in FIG. 5, the light barrier 6 is not stationary, but is at least partially mechanically connected to the transducer 4 which is displaceable in the transverse direction of the recording medium. The positioning device 5 is thereby designed such that the transducer 4 is positionable to various tracks on the recording medium 1. The active expanse of the light beam of the light barrier 6 in the transverse direction of the recording medium 1 is thereby at least as large as the maximum possible stroke in positioning the transducer 4. The arrangement of the light barrier 6 can occur in such a manner that either the light transmitter 11 or the light receiver 12 or both the light transmitter 11 and the light receiver 12 are mechanically connected to the transducer 4, as is disclosed in a similar manner in the British published application No. 2,008,290.

In a manner similar to that of the first embodiment of FIG. 1, the control unit 9 emits the control signal S2 to the positioning device 5 in order to position the transducer 4 to the corresponding track or the corresponding tracks on the recording medium 1. The converter 7 is designed in a manner similar to the converter illustrated in FIG. 4; however, it is not a constant value, but a value dependent on the respective track that is subtracted from the signal S0 output by the light barrier 6 in order to generate the control signal S1 in order to therefore produce a corresponding differential signal which indicates the deviation of the actual position from the reference position.

Again, it is assured by way of the arrangement that the distance between the position of the transducer 4 and the edge of the recording medium 1 is maintained constant, regardless of the play of the recording medium in the guide rollers 2 and 3, so that the reliability when recording and playing back data is increased and so that the track density, i.e. the number of parallel tracks on the recording medium, can be increased.

In case the converter 7 is constructed only of analog components, only of analog components, only the amplifier 14 is employed, this being designed as a differential amplifier and an analog value corresponding to the signal S3 is subtracted at its inverting input.

It is also possible to determine the position of the edge of the recording medium relative to the transducer with the assistance of the light barrier 6. To this end, it is required that the transducer 4 be displaceable using the positioning device 5 perpendicular to the moving direction of the recording medium so that a degree that the torsion of the light barrier 6 disposed on the transducer 4 is no longer masked by the recording medium 1. When the light beam is then interrupted for the first time during the movement of the transducer 4 in the direction towards the recording medium, the momentary value of the signal S0 and of the control signal S1 is modified so that the edge of the recording medium 1 is recognized. The analogous case applies when the transducer 4 is displaced in the upper direction to such a degree that the light beam of the light barrier 6 is completely masked by the recording medium. When the transducer 4 is then shifted in the opposite direction to such a degree that the light beam is no longer completely interrupted, the edge of the recording medium is again recognized on the basis of the change in the momentary value of the signal S0 or of the control signal S1. After the edge has been recognized, the control unit 9 can output corresponding control signals to the positioning device 5 in order to accurately position the transducer 4 to one or more tracks of the recording medium. Dynamic changes of the position of the recording medium 1 in the transverse direction are then continuously compensated using the converter 7.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An arrangement for positioning a transducer perpendicular to the running direction of a plurality of tracks of a tape-shaped recording medium and to compensate transverse deviation of the recording medium as it runs through a magnetic recording machine housing, said arrangment comprising:
   a fixed barrier device connected to the machine housing for emitting a light beam at an edge of the recording medium and producing an edge position signal in response to the light passing the edge;

control means operable to produce a positioning signal indicating the desired position of the transducer;

a converter connected to said light barrier for converting the edge position signal into a control signal representing the amount of transverse edge deviation; and positioning means carrying the transducer, said positioning means connected to said converter and connected to said control means and operable in response to the position and control signal to move the transducer to a track represented by said positioning signal and to move the transverse transducer perpendicularly of the recording medium a distance equal to the transverse edge deviation.

2. The arrangement of claim 1, wherein:

said converter comprises a subtractor operable to subtract a constant value reference signal, representing a reference position of the edge, from the edge position signal to produce the control signal.

3. The arrangement of claim 1, wherein:

said light barrier device comprises a light transmitter, and a light receiver for producing the edge position signal.

4. The arrangement of claim 1, and further comprising:

a further light barrier device at the opposite edge of the recording medium connected to and supplying a further edge position signal to said converter.

5. The arrangement of claim 1, wherein:

said recording medium is a magnetic tape; and
said transducer comprises a magnetic head.

6. An arrangement for positioning a transducer transversely of and with respect to at least one track of a tape-shaped recording medium to compensate for transverse deviation of the recording medium, said arrangment comprising:

a fixed light barrier device for emitting a light beam at an edge of the recording medium and producing an edge position signal in response to the light passing the edge;

a converter for converting the edge position signal into a control signal representing the amount of transverse edge deviation; and positioning means carrying the transducer, said positioning means connected to said converter and operable in response to said control signal to move the transducer transversely of the recording medium a distance equal to the transverse edge deviation, said fixed light barrier device comprising a light transmitter producing a light beam having an expanse which is at least equal to the maximum stroke of said positioning device, and a light receiver, one of said transmitter and said receiver carried by said positioning device.

7. The arrangement of claim 6, wherein:

said converter comprises a subtractor operable to subtract a constant value reference signal, representing a reference position of the edge, from the edge position signal to produce the control signal.

8. The arrangement of claim 6, and further comprising:

a further light barrier device carried by said positioning device at the opposite edge of the recording medium connected to and supplying a further edge position signal to said converter.

9. The arrangement of claim 6, wherein:

said recording medium is a magnetic tape; and
said transducer comprises a magnetic head.

* * * * *